(12) United States Patent
Chuong et al.

(10) Patent No.: US 9,863,261 B2
(45) Date of Patent: Jan. 9, 2018

(54) COMPONENT RETENTION WITH PROBE (71) Applicant: United Technologies Corporation, Hartford, CT (US)

(72) Inventors: Conway Chuong, Manchester, CT (US); Matthew Budnick, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 1412 days.

(21) Appl. No.: 13/730,901

(22) Filed: Dec. 29, 2012

(65) Prior Publication Data
US 2014/0186168 A1 Jul. 3, 2014

(51) Int. Cl.
| | | |
|---|---|---|
| *F01D 25/00* | (2006.01) |
| *F01D 9/06* | (2006.01) |
| *F01D 17/08* | (2006.01) |
| *F01D 25/16* | (2006.01) |
| *F02C 7/20* | (2006.01) |
| *F01D 9/04* | (2006.01) |
| *F01D 21/00* | (2006.01) |
| *F01D 25/28* | (2006.01) |

(52) U.S. Cl.
CPC .............. *F01D 9/065* (2013.01); *F01D 9/041* (2013.01); *F01D 17/08* (2013.01); *F01D 21/003* (2013.01); *F01D 25/162* (2013.01); *F01D 25/28* (2013.01); *F02C 7/20* (2013.01); *F05D 2230/642* (2013.01)

(58) Field of Classification Search
CPC .......... F01D 9/041; F01D 9/065; F01D 17/08; F01D 21/003; F01D 25/162; F01D 25/28; F02C 7/20; F05D 2230/642
See application file for complete search history.

(56) References Cited

U.S. PATENT DOCUMENTS

| | | |
|---|---|---|
| 2,124,108 A | 7/1938 | Grece |
| 3,007,312 A * | 11/1961 | Shutts ................ F23R 3/60 60/39.821 |
| 3,576,328 A | 4/1971 | Vose |
| 3,970,319 A | 7/1976 | Carroll et al. |
| 4,088,422 A | 5/1978 | Martin |
| 4,114,248 A | 9/1978 | Smith et al. |
| 4,478,551 A | 10/1984 | Honeycutt, Jr. et al. |
| 4,645,217 A | 2/1987 | Honeycutt, Jr. et al. |
| 4,678,113 A | 7/1987 | Bridges et al. |
| 4,738,453 A | 4/1988 | Ide |
| 4,756,536 A | 7/1988 | Belcher |
| 4,920,742 A | 5/1990 | Nash et al. |
| 4,987,736 A | 1/1991 | Ciokajlo et al. |

(Continued)

FOREIGN PATENT DOCUMENTS

EP 2511613 A2 10/2012

OTHER PUBLICATIONS

European Patent Office, the extended European search report, dated Dec. 15, 2015, 9 pages.

(Continued)

*Primary Examiner* — Igor Kershteyn
(74) *Attorney, Agent, or Firm* — Kinney & Lange, P.A.

(57) ABSTRACT

A gas turbine engine includes a casing, a probe, and a fairing. The probe extends through the casing and the fairing is disposed within the casing. The fairing is engaged by the probe to prevent circumferential movement of the fairing relative to the casing.

20 Claims, 5 Drawing Sheets

(56) References Cited

U.S. PATENT DOCUMENTS

| | | |
|---|---|---|
| 4,993,918 A | 2/1991 | Myers et al. |
| 5,031,922 A | 7/1991 | Heydrich |
| 5,042,823 A | 8/1991 | Mackay et al. |
| 5,071,138 A | 12/1991 | Mackay et al. |
| 5,100,158 A | 3/1992 | Gardner |
| 5,108,116 A | 4/1992 | Johnson et al. |
| 5,169,159 A | 12/1992 | Pope et al. |
| 5,174,584 A | 12/1992 | Lahrman |
| 5,185,996 A | 2/1993 | Smith et al. |
| 5,188,507 A | 2/1993 | Sweeney |
| 5,211,541 A | 5/1993 | Fledderjohn et al. |
| 5,236,302 A | 8/1993 | Weisgerber et al. |
| 5,246,295 A | 9/1993 | Ide |
| 5,273,397 A | 12/1993 | Czachor et al. |
| 5,335,490 A | 8/1994 | Johnson et al. |
| 5,338,154 A | 8/1994 | Meade et al. |
| 5,370,402 A | 12/1994 | Gardner et al. |
| 5,385,409 A | 1/1995 | Ide |
| 5,401,036 A | 3/1995 | Basu |
| 5,474,305 A | 12/1995 | Flower |
| 5,558,341 A | 9/1996 | McNickle et al. |
| 5,632,493 A | 5/1997 | Gardner |
| 5,755,445 A | 5/1998 | Arora |
| 5,911,400 A | 6/1999 | Niethammer et al. |
| 5,961,279 A | 10/1999 | Ingistov |
| 6,196,550 B1 | 3/2001 | Arora et al. |
| 6,343,912 B1 | 2/2002 | Manteiga et al. |
| 6,364,316 B1 | 4/2002 | Arora |
| 6,439,841 B1 | 8/2002 | Bosel |
| 6,601,853 B2 | 8/2003 | Inoue |
| 6,619,030 B1 | 9/2003 | Seda et al. |
| 6,637,751 B2 | 10/2003 | Aksit et al. |
| 6,638,013 B2 | 10/2003 | Nguyen et al. |
| 6,652,229 B2 | 11/2003 | Lu |
| 6,736,401 B2 | 5/2004 | Chung et al. |
| 6,805,356 B2 | 10/2004 | Inoue |
| 6,811,154 B2 | 11/2004 | Proctor et al. |
| 6,935,631 B2 | 8/2005 | Inoue |
| 6,983,608 B2 | 1/2006 | Allen, Jr. et al. |
| 7,094,026 B2 | 8/2006 | Coign et al. |
| 7,238,008 B2 | 7/2007 | Bobo et al. |
| 7,367,567 B2 | 5/2008 | Farah et al. |
| 7,371,044 B2 | 5/2008 | Nereim |
| 7,631,879 B2 | 12/2009 | Diantonio |
| 7,735,833 B2 | 6/2010 | Braun et al. |
| 7,798,768 B2 | 9/2010 | Strain et al. |
| 8,069,648 B2 | 12/2011 | Snyder et al. |
| 8,083,465 B2 | 12/2011 | Herbst et al. |
| 8,152,451 B2 | 4/2012 | Manteiga et al. |
| 8,221,071 B2 | 7/2012 | Wojno et al. |
| 8,245,518 B2 | 8/2012 | Durocher et al. |
| 2003/0025274 A1 | 2/2003 | Allan et al. |
| 2003/0042682 A1 | 3/2003 | Inoue |
| 2003/0062684 A1 | 4/2003 | Inoue |
| 2003/0062685 A1 | 4/2003 | Inoue |
| 2005/0046113 A1 | 3/2005 | Inoue |
| 2005/0072163 A1 | 4/2005 | Wells et al. |
| 2005/0152433 A1 | 7/2005 | Howard et al. |
| 2007/0107504 A1* | 5/2007 | Smed .................... F01D 21/003 73/112.01 |
| 2007/0119180 A1 | 5/2007 | Zigan et al. |
| 2007/0231122 A1 | 10/2007 | Tsuru et al. |
| 2009/0064657 A1 | 3/2009 | Zupanc et al. |
| 2009/0142182 A1 | 6/2009 | Kapustka |
| 2010/0132371 A1 | 6/2010 | Durocher et al. |
| 2010/0132374 A1 | 6/2010 | Manteiga et al. |
| 2010/0132377 A1 | 6/2010 | Durocher et al. |
| 2010/0275572 A1 | 11/2010 | Durocher et al. |
| 2010/0307165 A1 | 12/2010 | Wong et al. |
| 2010/0322759 A1 | 12/2010 | Tanioka |
| 2011/0000223 A1 | 1/2011 | Russberg |
| 2011/0214433 A1 | 9/2011 | Feindel et al. |
| 2011/0262277 A1 | 10/2011 | Sjoqvist et al. |
| 2012/0023967 A1* | 2/2012 | DeDe ..................... B64C 27/14 60/796 |
| 2012/0111023 A1 | 5/2012 | Sjoqvist et al. |

OTHER PUBLICATIONS

International Search Report and Written Opinion for Application Serial No. PCT/US2013/075446, dated Sep. 22, 2014, 13 pages.

* cited by examiner

COMPONENT RETENTION WITH PROBE

BACKGROUND

The invention relates to gas turbine engines, and more particularly to stator components of gas turbine engines.

Gas turbine engines operate according to a continuous-flow, Brayton cycle. A compressor section pressurizes an ambient air stream, fuel is added and the mixture is burned in a central combustor section. The combustion products expand through a turbine section where bladed rotors convert thermal energy from the combustion products into mechanical energy for rotating one or more centrally mounted shafts. The shafts, in turn, drive the forward compressor section, thus continuing the cycle. Gas turbine engines are compact and powerful power plants, making them suitable for powering aircraft, heavy equipment, ships and electrical power generators. In power generating applications, the combustion products can also drive a separate power turbine attached to an electrical generator.

Vane assemblies and other turbine engine components may experience adverse modal response during engine operation. Some of these modes may be within the engine operation speed envelope and may cause excessive vibration that reduces the life of the components. Conventional ways to retain turbine hardware from such modal response includes the use of pins or hooks to dampen the parts. Oftentimes components must be retained at multiple locations to meet desired tolerances and for safety purposes. Multiple retention points with hooks or pins can create the risk of component over-constraint and binding.

SUMMARY

A gas turbine engine includes a casing, a probe, and a fairing. The probe extends through the casing and the fairing is disposed within the casing. The fairing is engaged by the probe to prevent circumferential movement of the fairing relative to the casing.

An assembly for a gas turbine engine includes a frame, a probe, and a fairing. The probe is mounted to the frame and extends therethrough. The fairing defines a main gas flow path for the gas turbine engine and has a first fixed connection to the frame and a second connection to the probe. The second connection allows for generally radial movement of the fairing relative to the frame while preventing circumferential movement of the fairing relative to the casing.

A turbine section for a gas turbine engine includes a turbine frame, a fairing, a probe, and a bushing. The turbine frame is mounted along the turbine section and the fairing is disposed within the turbine frame to form a main gas flow path. The fairing has a boss disposed on an outer radial liner of the fairing. The probe is mounted to the turbine frame and extends between the fairing and the turbine frame. The bushing is disposed in an aperture in the boss and the bushing receives the probe therein. The bushing engages the boss to constrain the fairing from movement in a circumferential direction with respect to the frame.

DETAILED DESCRIPTION

The invention discloses the use of instrument probes for circumferential, and in some embodiments, axial retention of stator fairings. In particular, the probe extends through a casing and is received by a boss and bushing on the fairing. This configuration allows the fairing to grow radially (and in some embodiments axially) relative to the casing but constrains the fairing from circumferential movement (such as deflection) relative to the casing.

Figure 1:
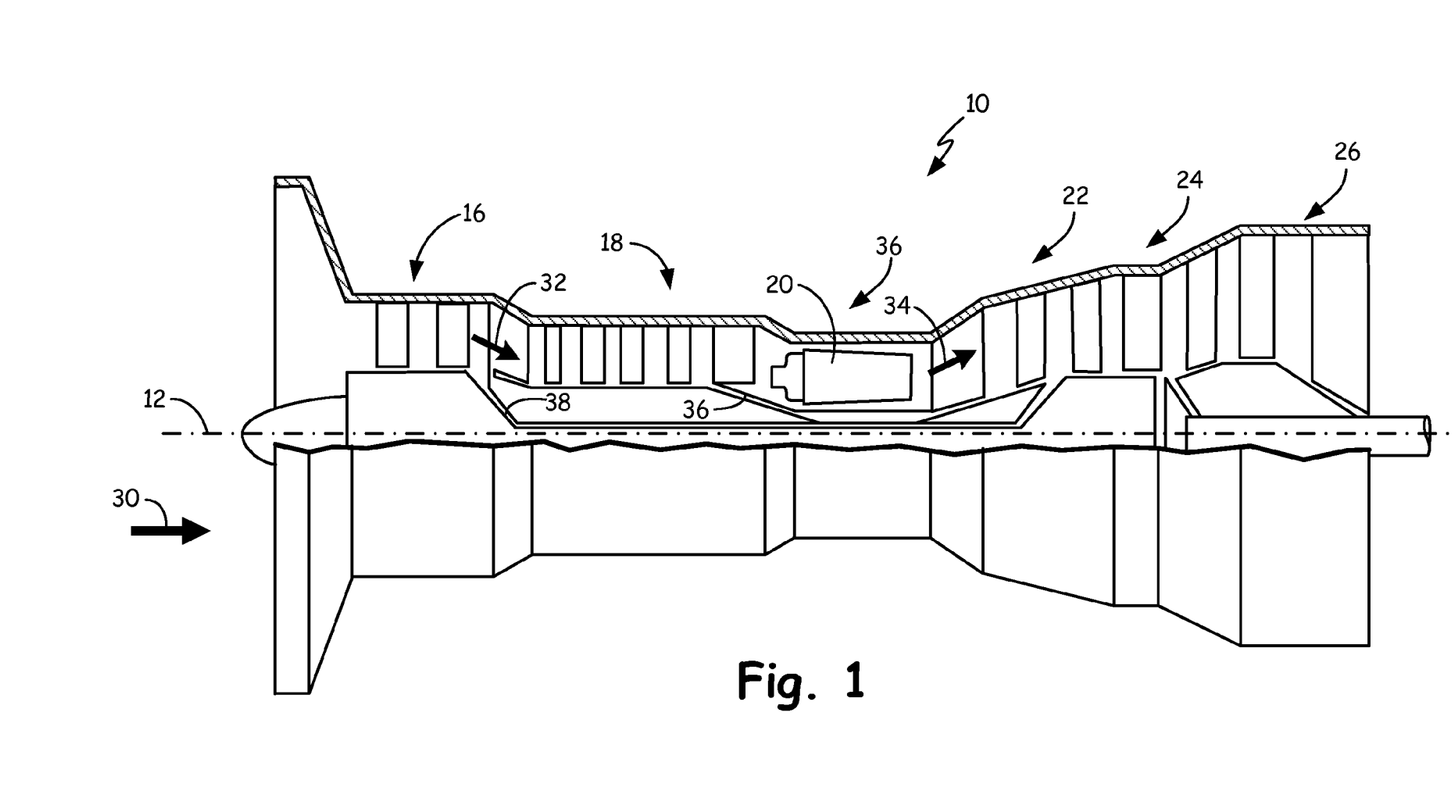
FIG. 1 is an industrial turbine cross-section.

An exemplary industrial gas turbine engine 10 is circumferentially disposed about a central, longitudinal axis or axial engine centerline axis 12 as illustrated in FIG. 1. The engine 10 includes in series order from front to rear, low and high pressure compressor sections 16 and 18, a central combustor section 20 and high and low pressure turbine sections 22 and 24. In some examples, a free turbine section 26 is disposed aft of the low pressure turbine 24. Although illustrated with reference to an industrial gas turbine engine, this application also extends to aero engines with a fan or gear driven fan, and engines with more or fewer sections than illustrated.

As is well known in the art of gas turbines, incoming ambient air 30 becomes pressurized air 32 in the compressors 16 and 18. Fuel mixes with the pressurized air 32 in the combustor section 20, where it is burned to produce combustion gases 34 that expand as they flow through turbine sections 22, 24 and power turbine 26. Turbine sections 22 and 24 drive high and low pressure rotor shafts 36 and 38 respectively, which rotate in response to the combustion products and thus the attached compressor sections 18, 16. Free turbine section 26 may, for example, drive an electrical generator, pump, or gearbox (not shown).

It is understood that FIG. 1 provides a basic understanding and overview of the various sections and the basic operation of an industrial gas turbine engine. It will become apparent to those skilled in the art that the present application is applicable to all types of gas turbine engines, including those with aerospace applications.

Figure 2:
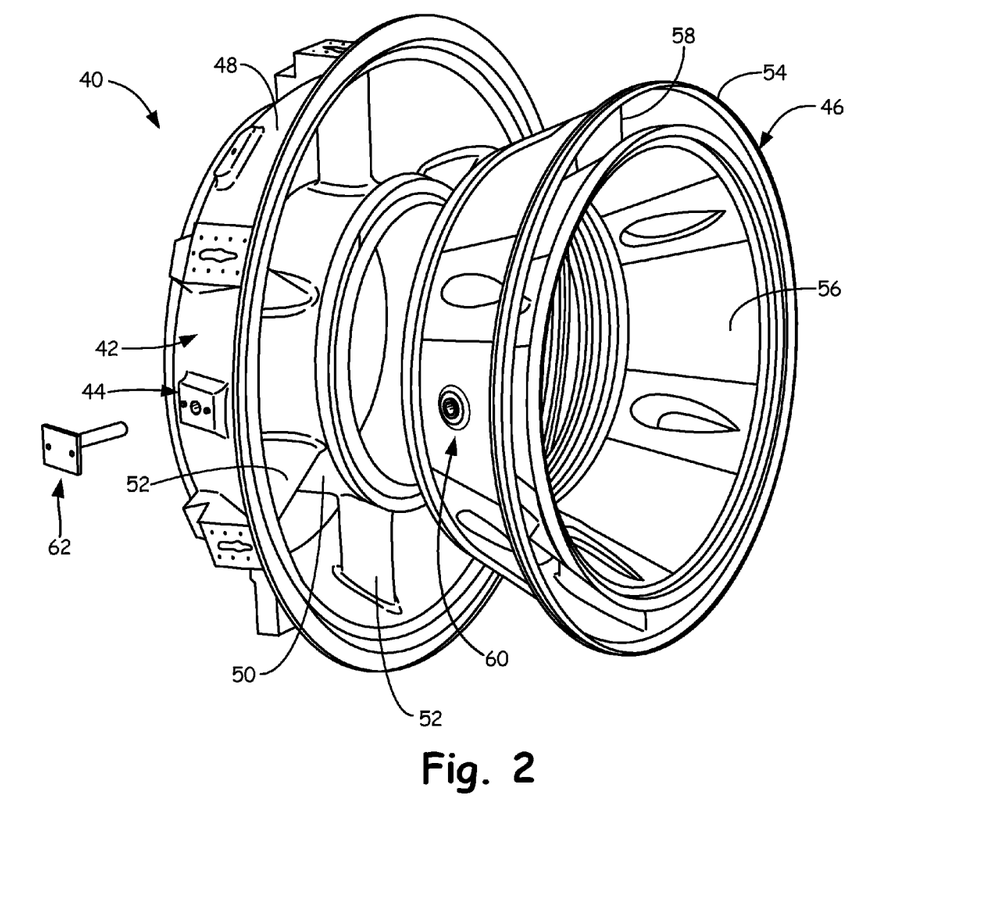
FIG. 2 is an exploded view of an assembly including a fairing, boss, and frame.

FIG. 2 shows an exploded view of assembly 40. Assembly 40 includes frame 42, boss 44, and fairing 46. Frame 42 includes outer radial casing 48, inner radial casing 50, and struts 52. Fairing 46 includes outer radial platform 54, inner radial platform 56, strut liners 58, and retention feature 60.

Frame 42 comprises a stator component of gas turbine engine 10 (FIG. 1) and can form portions of compressor sections 16 and 18 or turbine sections 22 and 24. Boss 44 is a thickened portion of outer radial casing 48 that has an aperture adapted to receive probe 62 (FIGS. 3A-3B) that extends into the main gas flow path of gas turbine engine 10. Fairing 46 is connected to the frame 42 when installed. Additionally, when installed fairing 46 is disposed within the frame 42 to form the main gas flow path for a portion of gas turbine engine 10.

As illustrated in FIG. 2, outer radial casing 48 of frame 42 is conically shaped and forms a portion of the casing of gas turbine engine 10 (FIG. 1), for example, in low pressure turbine section 24. Inner radial casing 50 is disposed generally radially inward of outer radial casing 48 and is connected thereto by struts 52.

Fairing 46 is adapted to be disposed within frame 42 between outer radial casing 48 and inner radial casing 50. Outer radial platform 54 of fairing 46 has a generally conical shape. Similarly, inner radial platform 56 has a generally conical shape. Inner radial platform 56 is spaced from outer radial platform 54 by strut liners 58. Strut liners 58 are adapted to be disposed around struts 52 of frame 42 when fairing 46 is assembled on frame 42. As discussed previously, outer radial platform 54, inner radial platform 56, and strut liners 58, form the main gas flow path for a portion of gas turbine engine 10 when assembled.

In the embodiment of FIG. 2, retention feature 60 is formed on fairing 46 and includes a second boss and aperture. Retention feature 60 allows probe 62 to extend through fairing 46 and enter the main gas flow path.

Figure 3A:
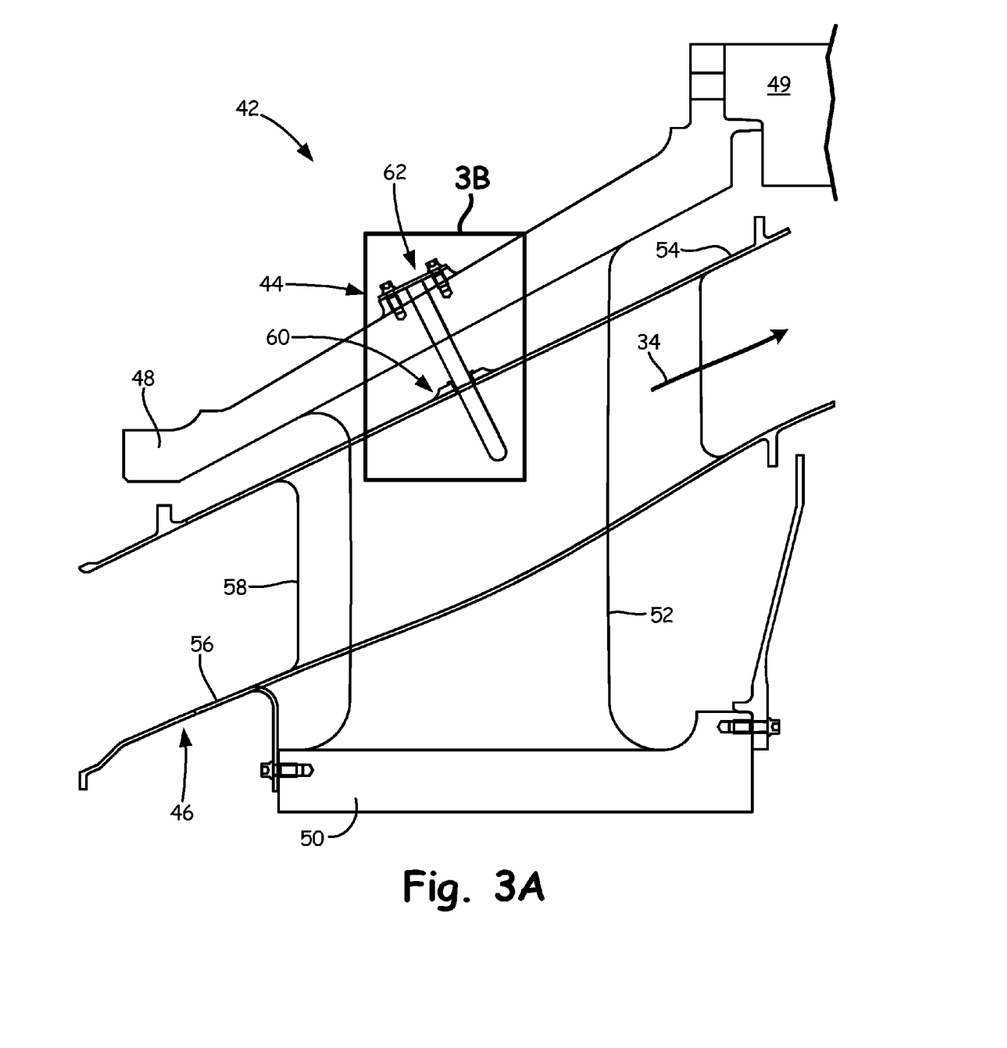
FIG. 3A is a cross-section of the assembly including the fairing, a probe, and the frame arranged together.
Figure 3B:
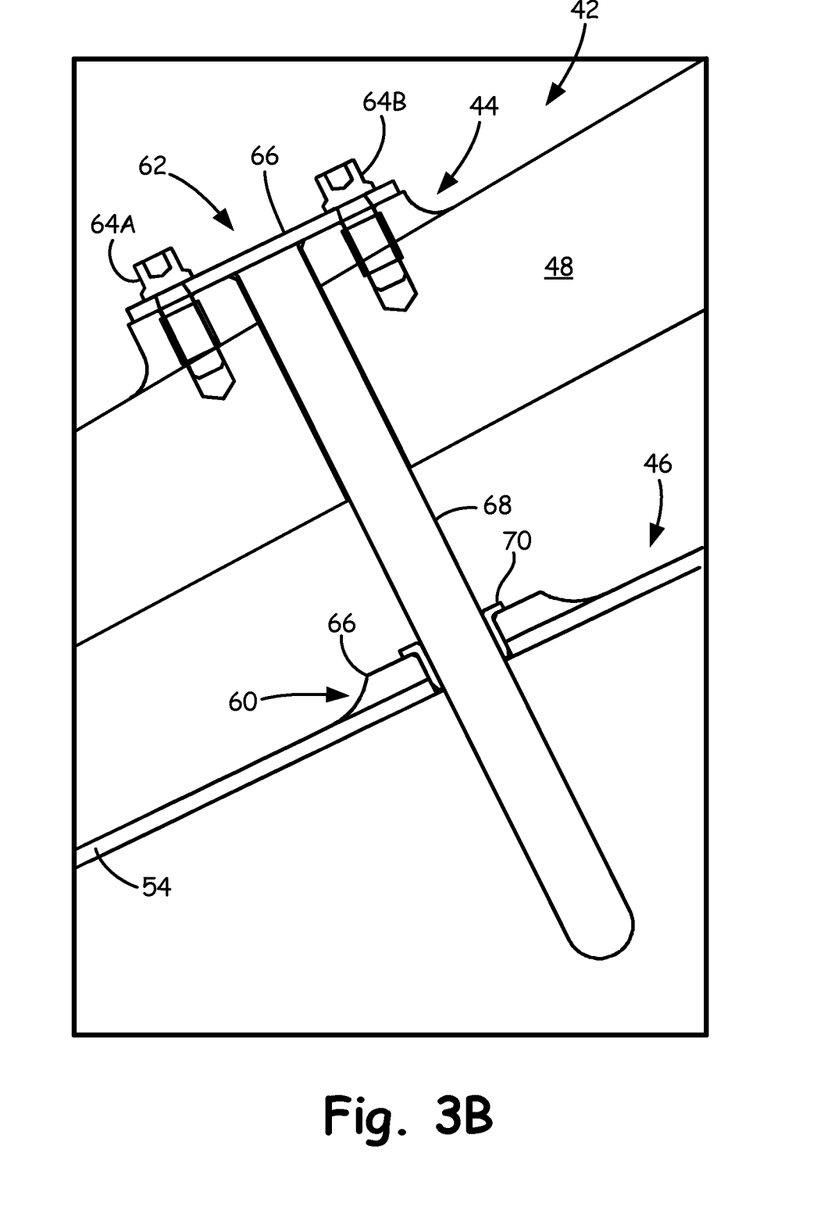
FIG. 3B is an enlarged cross-section of the probe and the boss.

FIG. 3A shows a cross-section of assembly 40 with fairing 46 installed within frame 42 and probe 62 extending through frame 42 and fairing 46. FIG. 3B shows an enlarged view of probe 62. In addition to first boss 44, outer radial casing 48, inner radial casing 50, struts 52 (only one is shown in FIG. 3A), outer radial platform 54, inner radial platform 56, strut liners 58, and retention feature 60, assembly 40 additionally includes probe 62, and fasteners 64A and 64B. Retention feature 60 includes boss 66 and bushing 70. Probe 62 includes shaft 68.

In FIG. 3A, outer radial casing 48 abuts and is affixed to a second outer radial casing 49 of another module of gas turbine engine 10 (FIG. 1). Probe 62 is attached to and extends through boss 44 of outer radial casing 48. As shown in FIG. 3B, probe 62 can be attached to boss 44 by fasteners 64A and 64B. Probe 62 has shaft 68 that extends through outer radial casing 48 and is received by and extends through retention feature 60 in fairing 46. Probe 62 extends into the main gas flow path defined by fairing 46 and can be used to measure attributes such as the temperature of combustion gases 34 passing along the main gas flow path. As used herein, probe 62 additionally may encompass a borescope plug that is removable from frame 42 to allow a borescope to be inserted to visually inspect components within gas turbine engine 10 for wear and/or damage.

In the embodiment shown in FIG. 3B, retention feature 60 of fairing 46 is adapted to mate with probe 62 but allows fairing 46 to move generally radially relative to probe 62 and frame 42. In particular, retention feature 60 is adapted with boss 66, which has an aperture that receives bushing 70 therein. Shaft 68 of probe 62 is received in bushing 70. Bushing 70 tightly constrains fairing 46 from generally axial or circumferential movement. However, bushing 70 can move generally radially along shaft 68 with movement of fairing 46 relative to shaft 68 and frame 42. Thus, retention feature 60 acts to constrain fairing 46 from both axial and circumferential movement (such as deflections of the fairing 46) relative to frame 42 but allows for generally radial movement of fairing 46 relative to frame 42.

In addition to retention via retention feature 60, in some embodiments a portion of inner radial surface 56 of fairing 46 is connected to a second axial end of inner radial platform 50. This connection is illustrated in FIG. 3B, and provides for axial, radial, and circumferential constraint of the axially forward portion of fairing 46 relative to frame 42. Thus, fairing 46 has a fixed connection (i.e., is radially, axially, and circumferentially constrained relative to the frame 42) to the frame 42 at a first location and has a second connection (via retention feature 60) with radial degrees of freedom at a second location.

Retention feature 60 allows for thermal growth and vibration dampening of fairing 46 as needed to achieve desired component life. Retention feature 60 does not over-constrain fairing 46, as retention feature 60 protects only against axial and circumferential movement of fairing 46 relative to frame 44.

Figure 4:
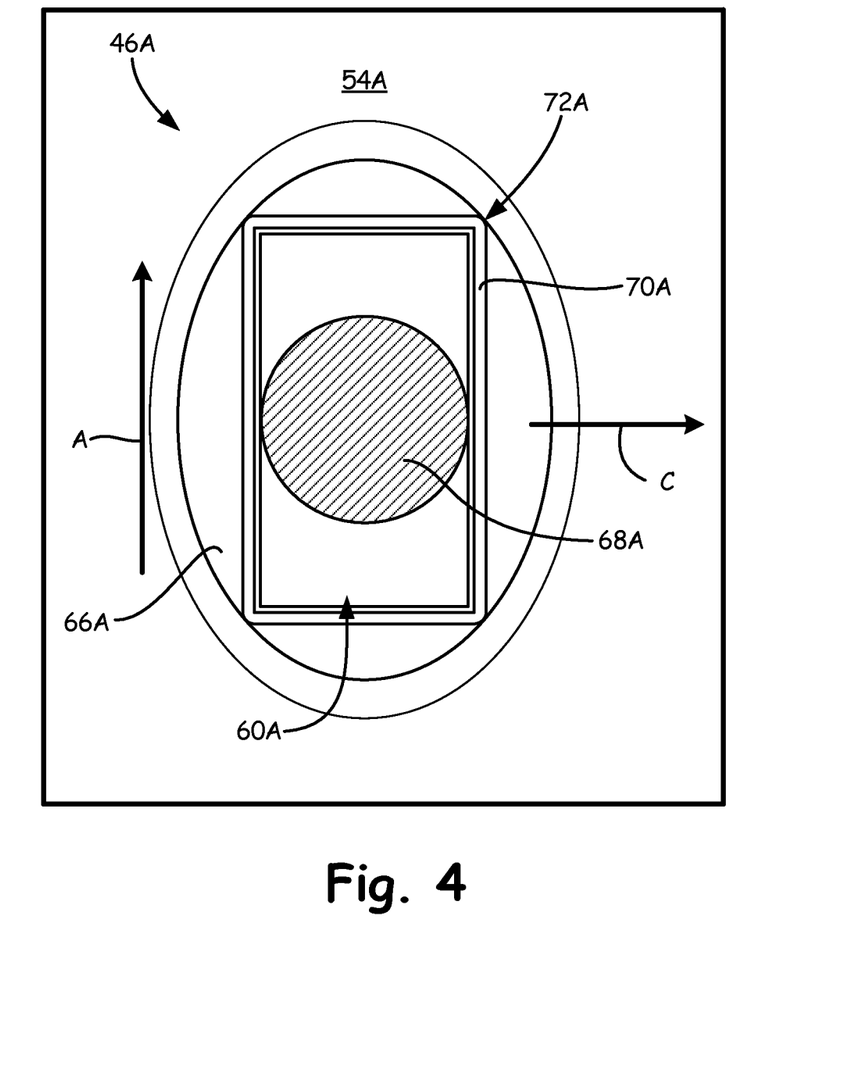
FIG. 4 is top view of another embodiment of the boss with a racetrack-shaped aperture receiving a bushing and the probe.

FIG. 4 shows another embodiment of retention feature 60A, which constrains fairing 46A from circumferential movement (as indicated by arrow C) but allows fairing 46A to move (for example deflect) both generally radially and generally axially (as indicated by arrow A).

Similar to the embodiment of FIGS. 3A and 3B, retention feature 60A includes boss 66A, which extends from outer radial platform 54A of fairing 46A. Boss 66A has aperture 72A therein that is designed as a slot with a racetrack shape. In other embodiments, aperture 72A can have a different shape such as an ellipse, rectangle, or square. Aperture 72A receives bushing 70A therein. Shaft 68A is received in bushing 70A.

As illustrated in FIG. 4, bushing 70A tightly constrains fairing 46A from generally circumferential movement because of the dimensions of bushing 70A relative to aperture 72A. Bushing 70A can be press-fit into fairing 46A and will not move relative to the fairing 46A. Shaft 68A will then track within racetrack aperture 72A in bushing 70A as fairing 46A moves generally axially relative to shaft 68A. The movement of the fairing 46A (and bushing 70A) relative shaft 68A allows fairing 46A to travel a limited distance relative to shaft 68A and frame 42. Thus, retention feature 60A acts to constrain fairing 46 from circumferential movement (such as deflections of the fairing 46A) relative to frame 42 but allows for generally radial movement and axial movement of fairing 46A relative to frame 42.

Retention feature 60A allows for thermal growth and vibration dampening of fairing 46A as needed to achieve desired component life. Retention feature 60A does not over-constrain fairing 46A, as retention feature 60A protects only against circumferential movement of fairing 46A relative to frame 42 (FIGS. 2 and 3A).

The invention discloses the use of instrument probes for circumferential, and in some instances, axial retention of stator fairings. In particular, the probe extends through a casing and is received by a boss and bushing on the fairing. This configuration allows the fairing to grow radially (and in some embodiments axially) relative to the casing but constrains the fairing from circumferential movement (such as deflection) relative to the casing.

DISCUSSION OF POSSIBLE EMBODIMENTS

The following are non-exclusive descriptions of possible embodiments of the present invention.

A gas turbine engine includes a casing, a probe, and a fairing. The probe extends through the casing and the fairing is disposed within the casing. The fairing is engaged by the probe to prevent circumferential movement of the fairing relative to the casing.

The gas turbine engine of the preceding paragraph can optionally include, additionally and/or alternatively, any one or more of the following features, configurations and/or additional components:

the probe engages a middle section of the fairing between a first axial end and a second opposing axial end of the casing;

the casing comprises an outer radial casing of the gas turbine engine, and wherein the probe is mounted to the outer radial casing and engages an outer radial liner of the fairing;

the casing comprises a portion of a turbine frame;

the fairing is additionally attached to an inner radial platform of the turbine frame;

the fairing has a boss, and wherein the probe extends though an aperture in the boss into a main engine gas flow path of the gas turbine engine;

a bushing disposed in the aperture and positioned around the probe, and wherein the aperture has a racetrack shape that allows the bushing and probe to move in a generally axial direction with respect to the fairing; and the fairing is unconstrained from movement in a generally radial direction relative to the frame but is constrained from movement in both an axial and the circumferential direction with respect to the frame.

An assembly for a gas turbine engine includes a frame, a probe, and a fairing. The probe is mounted to the frame and extends therethrough. The fairing defines a main gas flow path for the gas turbine engine and has a first fixed connection to the frame and a second connection to the probe. The second connection allows for generally radial movement of the fairing relative to the frame while preventing circumferential movement of the fairing relative to the casing.

The assembly of the preceding paragraph can optionally include, additionally and/or alternatively, any one or more of the following features, configurations and/or additional components:

a bushing disposed in an aperture in the fairing, and wherein the aperture has a racetrack shape that allows the bushing and probe to move in a generally axial direction with respect to the fairing;

the second connection occurs at a middle section of the fairing between a first axial end and a second opposing axial end of the frame;

the probe engages an outer radial liner of the fairing;

the frame comprises a turbine frame;

the fairing has a boss, and wherein the probe extends though an aperture in the boss into the main engine gas flow path of the gas turbine engine; and wherein the fairing is unconstrained from movement in a generally radial direction relative to the frame but is constrained from movement in both an axial and the circumferential direction with respect to the frame.

A turbine section for a gas turbine engine includes a turbine frame, a fairing, a probe, and a bushing. The turbine frame is mounted along the turbine section and the fairing is disposed within the turbine frame to form a main gas flow path. The fairing has a boss disposed on an outer radial liner of the fairing. The probe is mounted to the turbine frame and extends between the fairing and the turbine frame. The bushing is disposed in an aperture in the boss and the bushing receives the probe therein. The bushing engages the boss to constrain the fairing from movement in a circumferential direction with respect to the frame.

The turbine section of the preceding paragraph can optionally include, additionally and/or alternatively, any one or more of the following features, configurations and/or additional components:

the aperture has a racetrack shape that allows the bushing and probe to move in a generally axial direction with respect to the fairing;

the probe extends though an aperture in the boss into the main engine gas flow path of the gas turbine engine;

the fairing is unconstrained from movement in a generally radial direction relative to the frame but is constrained from movement in both an axial and the circumferential direction with respect to the frame; and the fairing is additionally attached to an inner radial platform of the turbine frame.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gas turbine engine comprising:
a casing;
a probe extending through the casing; and
a fairing disposed within the casing and engaged by the probe to prevent circumferential movement of the fairing relative to the casing.

2. The gas turbine engine of claim 1, wherein the probe engages a middle section of the fairing between a first axial end and a second opposing axial end of the casing.

3. The gas turbine engine of claim 1, wherein the casing comprises an outer radial casing of the gas turbine engine, and wherein the probe is mounted to the outer radial casing and engages an outer radial liner of the fairing.

4. The gas turbine engine of claim 1, wherein the casing comprises a portion of a turbine frame, and wherein the fairing is additionally attached to an inner radial platform of the turbine frame.

5. The gas turbine engine of claim 1, wherein the fairing has a boss, and wherein the probe extends through an aperture in the boss into a main engine gas flow path of the gas turbine engine, and further comprising a bushing disposed in the aperture and positioned around the probe, and wherein the aperture has a racetrack shape that allows the bushing and probe to move in a generally axial direction with respect to the fairing.

6. The gas turbine engine of claim 5, wherein the aperture is elongated in the axial direction such that an axial extent of the aperture is greater than a circumferential extent of the aperture.

7. The gas turbine engine of claim 1, wherein the fairing is unconstrained from movement in a generally radial direction relative to the frame but is constrained from movement in both an axial and the circumferential direction with respect to the frame.

8. The gas turbine engine of claim 1, wherein the probe has a shaft that extends through and engages the fairing.

9. An assembly for a gas turbine engine, comprising:
a frame;
a probe mounted to the frame and extending therethrough; and
a fairing that defines a main gas flow path for the gas turbine engine, wherein the fairing has a first fixed connection to the frame and a second connection to the probe, and wherein the second connection allows for generally radial movement of the fairing relative to the frame while preventing circumferential movement of the fairing relative to the casing.

10. The assembly of claim 9, further comprising a bushing disposed in an aperture in the fairing, and wherein the aperture has a racetrack shape that allows the bushing and probe to move in a generally axial direction with respect to the fairing.

11. The assembly of claim 9, wherein the second connection occurs at a middle section of the fairing between a first axial end and a second opposing axial end of the frame.

12. The assembly of claim 9, wherein the probe engages an outer radial liner of the fairing.

13. The assembly of claim 9, wherein the frame comprises a turbine frame.

14. The assembly of claim 9, wherein the fairing has a boss, and wherein the probe extends through an aperture in the boss into the main engine gas flow path of the gas turbine engine.

15. The assembly of claim 9, wherein the fairing is unconstrained from movement in a generally radial direction relative to the frame but is constrained from movement in both an axial and the circumferential direction with respect to the frame.

16. A turbine section for a gas turbine engine, comprising:
a turbine frame mounted along the turbine section;
a fairing disposed within the turbine frame to form a main gas flow path and having a boss disposed on an outer radial liner of the fairing;
a temperature-sensing probe mounted to the turbine frame and extending between the fairing and the turbine frame; and
a bushing disposed in an aperture in the boss, wherein the bushing receives the probe such that a shaft of the probe engages the bushing and the bushing engages the boss to constrain the fairing from movement in a circumferential direction with respect to the frame.

17. The turbine section of claim 16, wherein the aperture has a racetrack shape that allows the bushing and probe to move in a generally axial direction with respect to the fairing.

18. The turbine section of claim 16, wherein the probe extends through an aperture in the boss into the main engine gas flow path of the gas turbine engine.

19. The turbine section of claim 16, wherein the fairing is unconstrained from movement in a generally radial direction relative to the frame but is constrained from movement in both an axial and the circumferential direction with respect to the frame.

20. The turbine section of claim 16, wherein the fairing is additionally attached to an inner radial platform of the turbine frame.

* * * * *